United States Patent
Turtinen et al.

(10) Patent No.: US 12,127,280 B2
(45) Date of Patent: Oct. 22, 2024

(54) COMMUNICATION APPARATUS, METHOD AND COMPUTER PROGRAM FOR MAPPING A DEACTIVATED DUPLICATE RADIO LINK CONTROL TO AN ACTIVE CELL

(71) Applicant: NOKIA TECHNOLOGIES OY, Espoo (FI)

(72) Inventors: Samuli Turtinen, Ii (FI); Benoist Sebire, Tokyo (JP); Chunli Wu, Espoo (FI); Lei Du, Espoo (FI); Esa Malkamaki, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/623,316

(22) PCT Filed: Jun. 16, 2017

(86) PCT No.: PCT/CN2017/088801
§ 371 (c)(1),
(2) Date: Dec. 16, 2019

(87) PCT Pub. No.: WO2018/227625
PCT Pub. Date: Dec. 20, 2018

(65) Prior Publication Data
US 2020/0187284 A1 Jun. 11, 2020

(51) Int. Cl.
*H04W 76/15* (2018.01)
*H04W 36/00* (2009.01)
(Continued)

(52) U.S. Cl.
CPC ..... *H04W 76/15* (2018.02); *H04W 36/00692* (2023.05); *H04W 36/023* (2013.01); *H04W 36/08* (2013.01)

(58) Field of Classification Search
None
See application file for complete search history.

(56) References Cited

U.S. PATENT DOCUMENTS 8,605,674 B2    12/2013  Park et al.
10,405,231 B2*   9/2019  Lohr ............... H04W 36/00692
(Continued)

FOREIGN PATENT DOCUMENTS

CN   101932042 A   12/2010
CN   102387508 A    3/2012
(Continued)

OTHER PUBLICATIONS

Search Report and Written Opinion for Singapore Application No. 11201912191Q dated Feb. 22, 2021, 10 pages.
(Continued)

*Primary Examiner* — German Viana Di Prisco
(74) *Attorney, Agent, or Firm* — ALSTON & BIRD LLP (57) ABSTRACT

An apparatus comprises at least one processor and at least one memory including computer program code, the at least one memory and the computer program code configured to, with the at least one processor, cause the apparatus at least to: responsive to deactivation of all of a plurality of active cells associated with a duplicate link, cause said duplicate link to be deactivated.

14 Claims, 4 Drawing Sheets

(51) Int. Cl.
*H04W 36/02* (2009.01)
*H04W 36/08* (2009.01)

(56) References Cited

U.S. PATENT DOCUMENTS

| | | | |
|---|---|---|---|
| 11,363,569 | B2* | 6/2022 | Babaei .................. H04L 5/0094 |
| 2005/0147061 | A1 | 7/2005 | Francoeur et al. |
| 2010/0227614 | A1 | 9/2010 | Chun et al. |
| 2013/0039294 | A1 | 2/2013 | Wang |
| 2013/0077551 | A1 | 3/2013 | Lo et al. |
| 2014/0050113 | A1 | 2/2014 | Rosa et al. |
| 2014/0293896 | A1 | 10/2014 | Kuo |
| 2015/0181638 | A1 | 6/2015 | Tabet et al. |
| 2015/0319754 | A1 | 11/2015 | Ishida et al. |
| 2016/0234714 | A1 | 8/2016 | Basu Mallick et al. |
| 2016/0255675 | A1 | 9/2016 | Van Lieshout et al. |
| 2016/0286412 | A1 | 9/2016 | Kim et al. |
| 2016/0338132 | A1 | 11/2016 | Uchino et al. |
| 2016/0353507 | A1 | 12/2016 | Uemura et al. |
| 2017/0078984 | A1 | 3/2017 | Uemura et al. |
| 2017/0142770 | A1 | 5/2017 | Fu et al. |
| 2018/0049186 | A1 | 2/2018 | Hong et al. |
| 2018/0098250 | A1* | 4/2018 | Vrzic ................. H04W 36/0016 |
| 2018/0220326 | A1 | 8/2018 | Nagasaka et al. |
| 2018/0279168 | A1* | 9/2018 | Jheng .................... H04W 28/04 |
| 2018/0309660 | A1* | 10/2018 | Loehr ..................... H04L 45/24 |
| 2018/0324642 | A1* | 11/2018 | Yu ......................... H04L 5/0053 |
| 2018/0368132 | A1* | 12/2018 | Babaei .................. H04L 1/1819 |
| 2019/0327641 | A1* | 10/2019 | Mok ....................... H04W 4/40 |
| 2020/0007281 | A1* | 1/2020 | Kilinc ................... H04W 76/15 |
| 2020/0120569 | A1* | 4/2020 | Baek ...................... H04W 12/08 |

FOREIGN PATENT DOCUMENTS

| | | |
|---|---|---|
| CN | 103503535 A | 1/2014 |
| CN | 103888222 A | 6/2014 |
| CN | 104105220 A | 10/2014 |
| CN | 104427572 A | 3/2015 |
| CN | 106105301 A | 11/2016 |
| CO | 5300501 A1 | 7/2003 |
| JP | 2017-501649 A | 1/2017 |
| KR | 101387475 B1 | 4/2014 |
| KR | 20150050313 A | 5/2015 |
| KR | 20160110889 A | 9/2016 |
| TW | I461087 | 11/2014 |
| WO | WO 2013/050083 A1 | 4/2013 |
| WO | WO 2014/112043 A1 | 7/2014 |
| WO | WO 2015/035915 A1 | 3/2015 |
| WO | WO 2015/115268 A1 | 8/2015 |
| WO | WO 2015/141478 A1 | 9/2015 |
| WO | WO 2016/021822 A1 | 2/2016 |
| WO | WO 2016/021890 A1 | 2/2016 |
| WO | WO 2016/144078 A1 | 9/2016 |
| WO | WO 2017/018538 A1 | 2/2017 |
| WO | WO 2018/156074 A1 | 8/2018 |
| WO | WO 2018/170891 A1 | 9/2018 |
| WO | WO 2018/230920 A1 | 12/2018 |

OTHER PUBLICATIONS

"Activation and Deactivation of UL PDCP Duplication", 3GPP TSG-RAN WG2 Meeting #98, Hangzhou, China, R2-1705416 (May 19, 2017), 3 pages.
"Duplication Impacts to PDCP", 3GPP TSG-RAN WG2 Meeting #97bis, Spokane, USA, R2-1702642 (Apr. 7, 2017), 5 pages.
"Overview of Duplication Operation", 3GPP TSG-RAN WG2 Meeting #97bis, Spokane, USA, R2-1702632 (Apr. 7, 2017), 2 pages.
"De-Activation of Re-Ordering in PDCP", 3GPP TSG-RAN WG2 meeting #98, Hangzhou, China, R2-1705446 (May 19, 2017), 3 pages.
"Configuration and Activation/Deactivation of Duplication", 3GPP TSG-RAN WG2 Meeting #98, Hangzhou, China, R2-1704247 (May 19, 2017), 2 pages.

First Examination Report for India Application No. 201947052120 dated Mar. 15, 2021, 8 pages.
Office Action and Search Report for Taiwan Application No. 109116170 dated Sep. 2, 2020, 6 pages.
International Search Report and Written Opinion for Application No. PCT/CN2017/088801 dated Feb. 24, 2018, 8 pages.
Notice of Preliminary Rejection for Korean Patent Application No. 2020-7001380, dated Dec. 4, 2020, with English Summary, 6 pages.
3GPP TSG-RAN WG2 Meeting #98; Hangzhou, China, May 15-19, 2017; R2-1704660; Agenda Item 10.2.2; Source ZTE; Title: Consideration on the Activation/Deactivation of Data Duplication for CA; Document for: Discussion and Decision; 3 pages.
Office Action for Chinese Application No. 201780093523.7 dated May 31, 2021, 11 pages.
Office Action for Chile Application No. 201903662 dated Jul. 19, 2021, 22 pages.
Office Action for ARIPO Application No. AP/P/2019/012117 dated Sep. 7, 2021, 5 pages.
Extended European Search Report for European Application No. 17913387.1 dated Mar. 25, 2021, 10 pages.
ZTE, "Consideration on the BSR for Data Duplication", 3GPP TSG-RAN WG2 Meeting #98, R2-1704665, (May 15-19, 2017), 4 pages.
Huawei et al., "Interaction Between PDCP/RLC/MAC for Packet Duplication", 3GPP TSG RAN WG2 Meeting #98, R2-1704836, (May 15-19, 2017), 4 pages.
Qualcomm Incorporated, "Discussion on PDCP Duplication", 3GPP TSG-RAN WG2 Meeting #98, R2-1705056, (May 15-19, 2017), 2 pages.
ETSI MCC, "Report of 3GPP TSG RAN2#98 Meeting", 3GPP TSG-RAN WG2 Meeting #99, R2-1707601, (Aug. 21-25, 2017), 294 pages.
Decision to Grant for Japanese Application No. 2019-569972 dated Apr. 26, 2021, 5 pages.
Decision to Grant for Korean Application No. 10-2020-7001380 dated Jul. 1, 2021, 2 pages.
Notice of Allowance for Taiwanese Application No. 107120838 dated Feb. 17, 2020, 3 pages.
Notice of Allowance for Taiwanese Application No. 109116170 dated Mar. 31, 2021, 3 pages.
Notice of Eligibility for Grant for Singapore Application No. 11201912191Q dated Dec. 2, 2021, 5 pages.
Office Action and Search Report for Chilean Application No. 201903662 dated Jan. 17, 2022, 19 pages.
Office Action for Canadian Application No. 3,067,472 dated Mar. 26, 2021, 3 pages.
Office Action for Colombian Application No. NC2019/0014715 dated Dec. 1, 2020, 12 pages.
Office Action for Taiwanese Application No. 107120838 dated Feb. 11, 2019, 5 pages.
Qualcomm Incorporated, "On RLF and RLM Requirements for the Special SCell", 3GPP TSG-RAN WG2 Meeting #85bis, R2-141672, (Mar. 31-Apr. 4, 2014), 3 pages.
Decision to Grant for Chinese Application No. 201780093523.7 dated Mar. 7, 2022, 3 pages.
Examination Report for Australian Application No. 2017418048 dated Apr. 8, 2022, 3 pages.
Office Action for Canadian Application No. 3,067,472 dated Feb. 24, 2022, 3 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 v13.7.0, (Mar. 21, 2017), 312 pages.
"3rd Generation Partnership Project; Technical Specification Group Radio Access Network; NR; NR and NG-RAN Overall Description; Stage 2 (Release 15)", 3GPP TS 38.300 v0.2.1, (May 10, 2017), 48 pages.
Office Action for ARIPO Application No. AP/P/2019/012117 dated Jun. 21, 2022, 6 pages.
Office Action for Australian Application No. 20174180408 dated Jul. 25, 2022, 3 pages.

(56) References Cited

OTHER PUBLICATIONS

Office Action for European Application No. 17913387.1 dated Feb. 1, 2023, 5 pages.
Notice of Allowance for Canadian Application No. 3,067,472 dated Mar. 14, 2023, 1 page.
Notice of Allowance for Indonesian Application No. P00201911899 dated Mar. 9, 2023, 4 pages.
Notice of Allowance for Mexico Application No. MX/a/2019/015300 dated Jul. 5, 2023, 6 pages.
Notice of Allowance for Vietnamese Application No. 1-2019-07264 dated Jun. 30, 2023, 2 pages.
Office Action for Egyptian Application No. 1994/2019 dated Jul. 19, 2023, 7 pages.
Office Action for Indonesian Application No. P00201911899 dated Nov. 11, 2022, 7 pages.
Office Action for Mexico Application No. MX/a/2019/015300 dated Mar. 29, 2023, 6 pages.
Office Action for Saudi Arabia Application No. 519410832 dated Aug. 9, 2023, 6 pages.
Office Action for Thailand Application No. 1901007854 dated Dec. 22, 2022, 7 pages.
Office Action for Vietnamese Application No. 1-2020-06487 dated Apr. 23, 2021, 2 pages.
Notice of Acceptance for Australian Application No. 2022287633 dated Mar. 7, 2024, 3 pages.
Office Action for Brazilian Application No. BR112019026781-6 dated Mar. 27, 2024, 8 pages.
Office Action for Canadian Application No. 3,067,472 dated Mar. 28, 2024, 3 pages.
Office Action for Chinese Application No. 202210562172.2 dated Apr. 24, 2024, 10 pages.
Office Action for Malaysian Application No. PI 2019007492 dated Apr. 8, 2024, 2 pages.
Decision to Grant for ARIPO Application No. AP/P/2019/012117 dated Jun. 21, 2022, 6 pages.
Decision to Grant for European Application No. 17913387.1 dated Jan. 2, 2024, 8 pages.
Hearing Notice for Indian Application No. 201947052120 dated Jan. 1, 2024, 2 pages.
Notice of Acceptance for Australian Application No. 2017418048 dated Sep. 27, 2022, 3 pages.
Notice of Allowance for Canadian Application No. 3,067,472 dated Sep. 13, 2023, 1 page.
Office Action for Australian Application No. 2022287633 dated Sep. 27, 2023, 2 pages.
Office Action for Egyptian Application No. 1994/2019 dated Dec. 18, 2023, 7 pages.

* cited by examiner

COMMUNICATION APPARATUS, METHOD AND COMPUTER PROGRAM FOR MAPPING A DEACTIVATED DUPLICATE RADIO LINK CONTROL TO AN ACTIVE CELL

CROSS-REFERENCE TO RELATED APPLICATIONS

The present application is a national phase entry of International Application No. PCT/CN2017/088801, filed Jun. 16, 2017, the contents of which are incorporated herein by reference in its entirety.

FIELD

This disclosure relates to a method and apparatus and in particular to a method and apparatus having carrier aggregation and duplication of a link.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or Wi-Fi). Wi-Fi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardized radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A).

Since introduction of fourth generation (4G) services increasing interest has been paid to the next, or fifth generation (5G) standard. 5G may also be referred to as a NR network. Standardization of 5G or NR networks is ongoing in 3GPP.

SUMMARY

According to a first aspect, there is provided an apparatus comprising: at least one processor and at least one memory including computer program code, the at least one memory and the computer program code configured to, with the at least one processor, cause the apparatus at least to: responsive to deactivation of all of a plurality of active cells associated with a duplicate link, cause said duplicate link to be deactivated.

The at least one memory and the computer code may be configured, with the at least one processor, to cause the apparatus, responsive to deactivation of said duplicate link, to cause data in a buffer associated with said deactivated duplicate link to be transmitted from a user equipment to an access point.

The at least one memory and the computer code may be configured, with the at least one processor, to cause the apparatus to determine if said buffer has data to be transmitted after said deactivation of said duplicate link.

The buffer may be associated with a radio link control entity associated with said deactivated duplicate link.

A logical channel may be associated with said duplicate link, and the at least one memory and the computer code may be configured, with the at least one processor, to cause the apparatus to map said logical channel to at least one active cell associated with an original link such that said data is transmitted on said logical channel to said at least one active cell of said access point.

The at least one active cell may comprise at least one of a primary cell and a secondary cell.

The at least one memory and the computer code may be configured, with the at least one processor, to cause the apparatus to cause said data in said buffer associated with said deactivated duplicate link to be transmitted until one of: all of said data has been transmitted; and said duplicate link is reactivated.

The apparatus may be provided in a wireless device.

According to another aspect, there is provided an apparatus comprising: at least one processor and at least one memory including computer program code, the at least one memory and the computer program code configured to, with the at least one processor, cause the apparatus at least to: responsive to deactivation of all of a plurality of active cells associated with duplication, cause said duplication to be deactivated.

The at least one memory and the computer code may be configured, with the at least one processor, to cause the apparatus, responsive to deactivation of said duplication, to cause data in a buffer associated with said deactivated duplication to be transmitted from a user equipment to an access point.

The at least one memory and the computer code may be configured, with the at least one processor, to cause the apparatus to determine if said buffer has data to be transmitted after said deactivation of said duplication.

The buffer may be associated with a radio link control entity associated with said deactivated duplication.

A logical channel may be associated with said duplication, and the at least one memory and the computer code may be configured, with the at least one processor, to cause the apparatus to map said logical channel to at least one active cell associated with an original link such that said data is transmitted on said logical channel to said at least one active cell of said access point.

The at least one active cell may comprise at least one of a primary cell and a secondary cell.

The at least one memory and the computer code may be configured, with the at least one processor, to cause the apparatus to cause said data in said buffer associated with said deactivated duplication to be transmitted until one of: all of said data has been transmitted; and said duplication is reactivated.

The apparatus may be provided in a wireless device.

According to another aspect there is provided a method comprising: responsive to deactivation of all of a plurality of active cells associated with a duplicate link, causing said duplicated link to be deactivated.

The method may comprise responsive to deactivation of said duplicate link, causing data in a buffer associated with said deactivated duplicate link to be transmitted from a user equipment to an access point.

The method may comprise determining if said buffer has data to be transmitted after said deactivation of said duplicate link.

The buffer may be associated with a radio link control entity associated with said deactivated duplicate link.

A logical channel may be associated with said duplicate link, said method may comprise mapping said logical channel to at least one active cell associated with an original link such that said data is transmitted on said logical channel to said at least one active cell of said access point.

The active cell may be one of a primary cell and a secondary cell.

The method may comprise causing said data in said buffer associated with said deactivated duplicate link to be transmitted until one of: all of said data has been transmitted; and said duplicate link is reactivated.

According to another aspect there is provided a method comprising: responsive to deactivation of all of a plurality of active cells associated with a duplicate link, causing said duplication to be deactivated.

The method may comprise responsive to deactivation of said duplication, causing data in a buffer associated with said deactivated duplicate link to be transmitted from a user equipment to an access point.

The method may comprise determining if said buffer has data to be transmitted after said deactivation of said duplication.

The buffer may be associated with a radio link control entity associated with said deactivated duplicate link.

A logical channel may be associated with said duplicate link, said method may comprise mapping said logical channel to at least one active cell associated with an original link such that said data is transmitted on said logical channel to said at least one active cell of said access point.

The active cell may be one of a primary cell and a secondary cell.

The method may comprise causing said data in said buffer associated with said deactivated duplicate link to be transmitted until one of: all of said data has been transmitted; and said duplication is reactivated.

According to another aspect, there is provided a method comprising: allowing a logical channel to use only a subset of available cells when a duplicate link is activated; and allowing the logical channel to use any of said available cells when said duplicate link is deactivated.

According to an another aspect, there is provided an apparatus comprising: at least one processor and at least one memory including computer program code, the at least one memory and the computer program code configured to, with the at least one processor, cause the apparatus at least to: allow a logical channel to use only a subset of available cells when a duplicate link is activated; and allow the logical channel to use any of said available cells when said duplicate link is deactivated.

According to another aspect, there is provided a method comprising responsive to deactivation of duplication of a radio bearer, causing a default logical channel to be mapped to any one or more of active serving cells.

According to another aspect, there is provided an apparatus comprising: at least one processor and at least one memory including computer program code, the at least one memory and the computer program code configured to, with the at least one processor, cause the apparatus at least to: responsive to deactivation of duplication of a radio bearer, cause a default logical channel to is mapped to any one or more of active serving cells.

According to another aspect, there is provided a method comprising: allowing a logical channel to use only a subset of available serving cells when duplication of the associated radio bearer is activated; and allowing the logical channel to use any of said available serving cells when said duplication of the associated radio bearer is deactivated.

According to another aspect, there is provided a method comprising: allowing a logical channel to use only a subset of available serving cells when duplication is activated; and allowing the logical channel to use any of said available serving cells when said is deactivated.

According to another aspect, there is provided an apparatus comprising: at least one processor and at least one memory including computer program code, the at least one memory and the computer program code configured to, with the at least one processor, cause the apparatus at least to: allow a logical channel to use only a subset of available serving cells when duplication of the associated radio bearer is activated; and allow the logical channel to use any of said available serving cells when said duplication of the associated radio bearer is deactivated.

According to another aspect, there is provided an apparatus comprising: at least one processor and at least one memory including computer program code, the at least one memory and the computer program code configured to, with the at least one processor, cause the apparatus at least to: allow a logical channel to use only a subset of available serving cells when duplication is activated; and allow the logical channel to use any of said available serving cells when said is deactivated.

According to another aspect, there is provided a method comprising: causing at an access node deactivation of at least one of a plurality of cells associated with a duplicate link to deactivate said duplicate link.

According to another aspect, there is provided a computer program product for a computer, comprising software code portions for performing the steps of any of the above aspects, when the program is run on the computer.

A computer program comprising program code means adapted to perform the methods may also be provided.

In the above, many different embodiments have been described. It should be appreciated that further embodiments may be provided by the combination of any two or more of the embodiments described above.

BRIEF DESCRIPTION OF FIGURES

Some embodiments will now be described in further detail, by way of example only, with reference to the following examples and accompanying drawings, in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
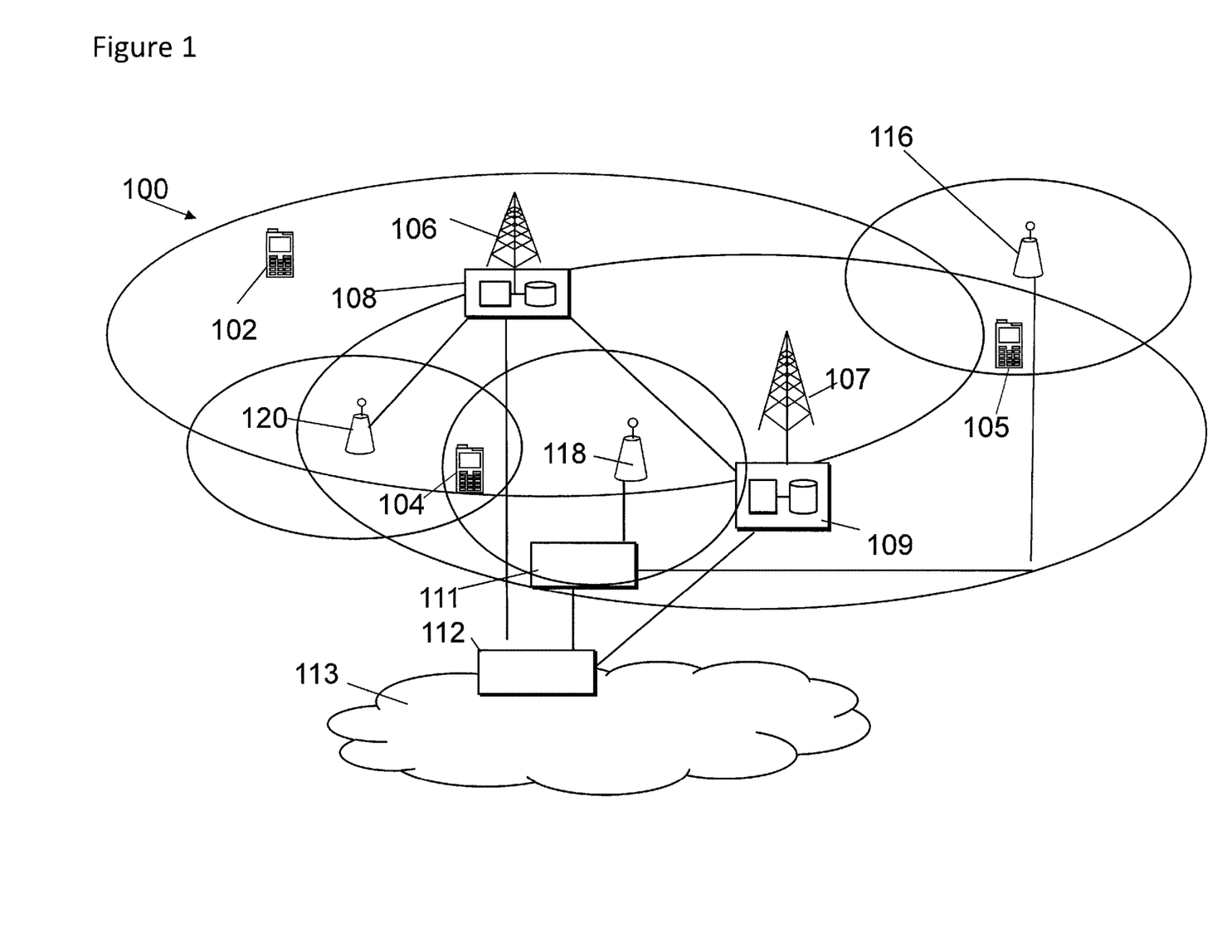
FIG. 1 shows a schematic example of a wireless communication system.

In a wireless communication system 100, such as that shown in FIG. 1, wireless communication devices, for example, user equipment (UE) or MTC devices 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Control Unit (CU). In FIG. 1 control apparatus 108 and 109 are shown to control the respective macro level base stations 106 and 107. In some systems, the control apparatus may additionally or alternatively be provided in a CU. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
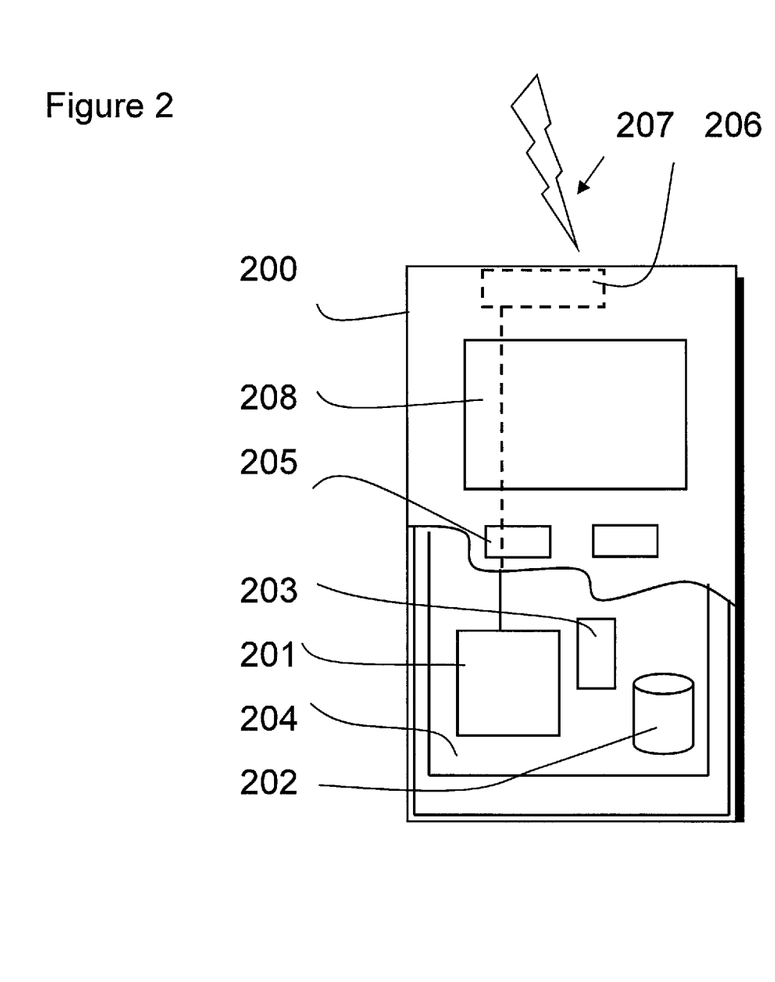
FIG. 2 shows an example of a communication device.

A possible wireless communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A wireless device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the wireless device by means of a suitable user interface such as key pad 205, voice commands, touch sensitive screen or pad, combinations thereof or the like. A display 208, a speaker and a microphone can be also provided. Furthermore, a wireless communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced NodeBs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a communications system is the 5G system. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

The base stations in 5G may be referred to as gNB.

In some embodiments carrier aggregation and/or dual connectivity is used in conjunction with duplication of a link.

Some embodiments relate to a PDCP (packet data layer convergence protocol) duplication feature. Some embodiments may relate to SCell (secondary cell) deactivation implications to duplication.

A RRC (radio resource control) may configure PDCP for duplication and the radio protocols of the UE with separate RLC (radio link control) entities and logical channels LCH to handle duplicates (referred to as "legs").

Only one additional leg may be configured for PDCP duplicates.

The original PDCP PDU (packet data unit) and the corresponding duplicate may not be transmitted on the same transport block TB in some embodiments.

In the case of CA (carrier aggregation), there may be support of PDCP duplicates on the same carrier with a restriction to prevent them from being transmitted on the same transport block. They may be sent on different carriers. In other embodiments, there may be no such limitations.

The PDCP duplication solution for CA may require only one MAC entity.

Logical channel mapping restrictions may be provided to handle duplicates in within one MAC entity (CA).

UL (uplink) PDCP duplication may be configurable per DRB (data radio bearer) and, for NR-NR (new radio-new radio) DC (dual connectivity) case, per SRB (signaling radio bearer).

The initial state of the UL PDCP duplication (duplication active or not active and if not active which leg is used) may be a default and/or may be signaled by RRC.

A mechanism to start/stop PDCP duplication more quickly and/or with less signaling overhead compared to RRC reconfiguration may be provided.

A MAC CE (media access control control element) approach may be used for control of UL duplication.

In the case of duplication in CA case, it has been proposed that duplication on a single carrier may not be supported. RRC configured mapping of the two LCHs to different carriers may be supported. One carrier may not have both of the LCHs mapped to it, in some embodiments. Duplicated PDCP PDUs may be submitted to two different RLC entities.

It has been proposed that SCell activation/deactivation be supported for NR CA. As in LTE, activation/deactivation may be controlled per CC (component carrier) by explicit indication and implicit mechanism for NR CA.

Configuration of implicit deactivation mechanism may be per CC for NR CA.

As can be seen above, certain LCH (duplicate of another) may be configured to be mapped on certain carrier(s) of the set of carriers configured for the UE. Furthermore, SCell deactivation may be supported based on the explicit and/or implicit mechanism for NR CA as they were supported in LTE.

Some embodiments may address UE behaviour upon SCell deactivation for which a duplicate LCH has been mapped and there is no other SCell/carrier for which to map the LCH.

Consider when one or several SCells are deactivated. This may be explicitly by the NW with a MAC control element, implicitly due to the CA deactivation timer expiry or in any other way. In some embodiments, for a radio bearer with duplication configured and activated, if none of the LCH(s) configured for duplication can be transmitted because no PScell/SCells configured for possible mapping of the data for those LCH(s) remain activated, duplication for that radio bearer is then deactivated.

In case of DC, duplication shall be deactivated only when the whole SCG cells (including both PScell and Scells) are all deactivated.

In some embodiments, for a radio bearer with duplication configured and activated, if one of the LCH(s) configured for duplication cannot be transmitted because no SCell configured for possible mapping of the data for that LCH remains activated, duplication for that radio bearer is then deactivated. There may be only one LCH for duplication.

In some embodiments, the network or any other suitable entity may ensure the default LCH of the radio bearer, i.e., not LCH(s) configured for duplication, can be mapped to an active cell. If an event where the default LCH cannot be mapped to any SCell occurs, the UE may be allowed to map the default LCH to PCell. This may require none of the LCHs of this radio bearer be mapped to the PCell. In other embodiments, it may be possible for both LCHs to map to the same PCell on a temporary basis.

With respect to the logical channels if the RLC entity in the UE still has data to transmit (e.g., in the re-transmission buffer) after the duplication deactivation, the LCH(s) may be allowed to be mapped to any active Serving Cell of the MAC entity until the buffer is run empty. In some embodiments, mapping restrictions due to different numerologies/TTI (transmission time interval) lengths of UL grants may or may not apply in that case (i.e. when duplication is deactivated).

This stems from the fact that the remaining data in the buffer may not be useful as the duplication is also deactivated, so it should just get transmitted to synchronise peer RLC entities.

The logical channel mapping restrictions to certain numerologies/TTI lengths can be configured by the NW. For example if the service carried in the LCH requires a certain latency, it may be mapped to short TTI lengths or to a numerology with big subcarrier spacing.

In one embodiment the UE may indicate or may be configured to indicate the event of implicit duplication deactivation for a certain radio bearer to the NW. This may for example be in the form of a MAC CE or a RRC protocol message.

This may tackle some error scenarios where the NW does not know everything that happened in the UE, e.g., as a result of missing a DL MAC CE which tried to deactivate duplication previously.

Figure 3:
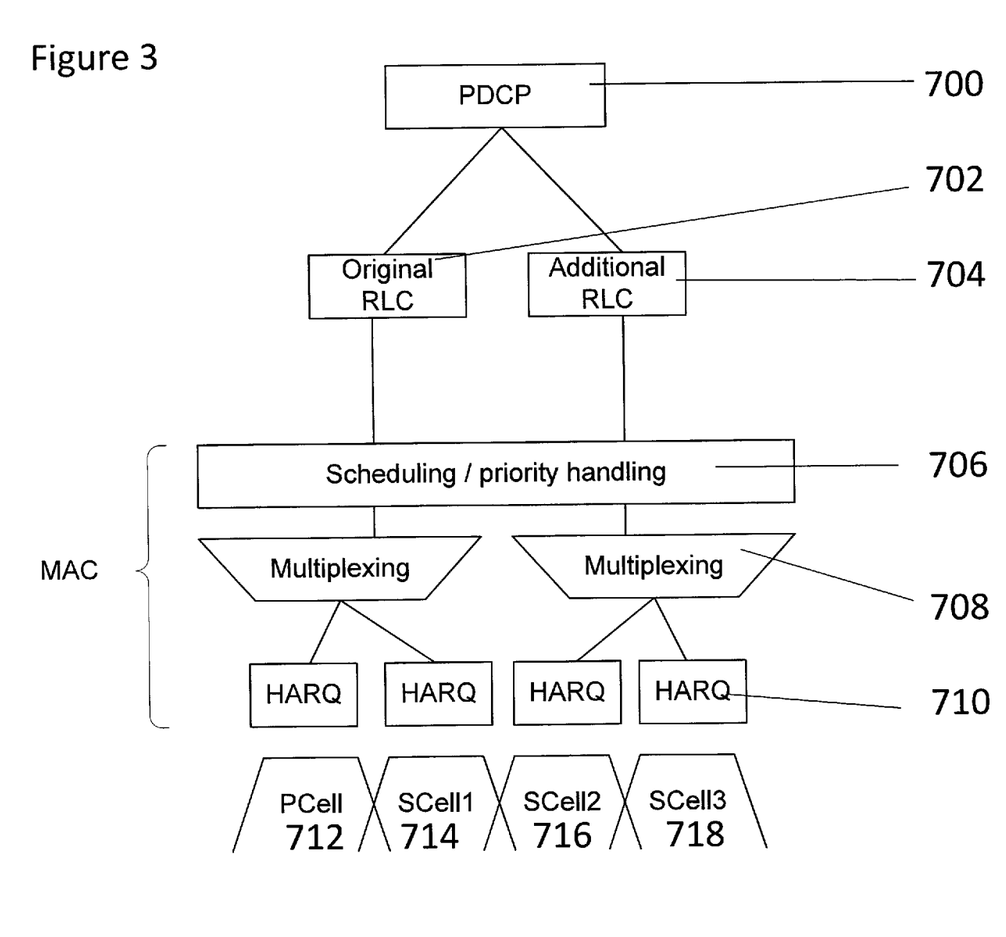
FIG. 3 shows an example of logical channel mapping in a user equipment.

FIG. 3 shows an example scenario of the mapping of logical channels for a duplicate bearer in a UE. A common PDCP 700 is provided with an original RLC 702 which refers to the 'default or original LCH' of the radio bearer. The additional RLC refers to the LCH configured for duplication.

The MAC layer comprises a scheduling and priority handling function 706 is provided to schedule the default LCH and the duplicate. The MAC layer also comprises two multiplexing functions 708, one associated with the original RLC and one associated with the duplicate RLC. Alternatively, the MAC layer may also comprise of only one multiplexing function 708 which is associated to both the original RLC and the duplicate RLC. Finally, the MAC layer comprises four HARQ functions 710, one for each serving cell. Two of the HARQ functions are associated with one of the multiplexing functions and two of the HARQ functions are associated with the other of the multiplexing functions.

A PCell 712 is associated with one of the HARQ functions. This is associated with the original RLC along with a first SCell 714. The first SCell 714 is associated with a respective one of the HARQ functions.

Second and third SCells 716 and 718 are respectively associated with HARQ functions. The second and third SCells 716 and 718 are associated with the additional RLC.

With a SCell deactivation function, if the second and third SCell 716 and 718 get deactivated, the data from the additional RLC entity cannot be mapped to any SCell and the duplication is deactivated according to some embodiments.

In some embodiments, the additional RLC entity may be allowed to map the remaining data (e.g., re-transmission buffer data) to the PCell and/or the first SCell 714 until the RLC buffer is run empty or until any of the second or third SCells are activated again such that duplication is activated again. The duplication may be activated with a separate DL MAC CE from the SCell activation by the network entity.

Some embodiments may have the advantages that the duplication deactivation is associated with the SCell deactivation saving overhead as well as overcoming the possible error scenario where duplication was deactivated before but the corresponding command was lost.

When duplication is deactivated (e.g., LCH(s) associated with additional link is deactivated), default LCH associated with original link can only use PCell 712 and SCell 714 in this case, i.e., there is not full scheduling flexibility for default LCH even if duplication is not used.

In some embodiments, the LCH associated with the original link is able to use any serving cell when duplication is deactivated. When duplication is activated, the LCH associated with the original link may be limited as to which serving cells that LCH may be used. This limitation may only apply when duplication is activated. During the transition period after the activation some PDCP PDUs from both the LCH may end up in the same serving cell but this may not cause significant problems. For example, the default LCH associated with the original link may be mapped to PCell 712 and SCell1 714 when duplication is activated and the other LCH the mapped to SCell2 716 and SCell3 718. When duplication is deactivated and the other LCH is not used anymore, then the default LCH may be allowed to be mapped to any active serving cell, i.e., to PCell 712, SCell1 714, SCell2 716, SCell3 718, allowing full scheduling flexibility for the default LCH whenever duplication is deactivated, i.e., the same flexibility there would be if duplication would not be configured at all.

Figure 4:
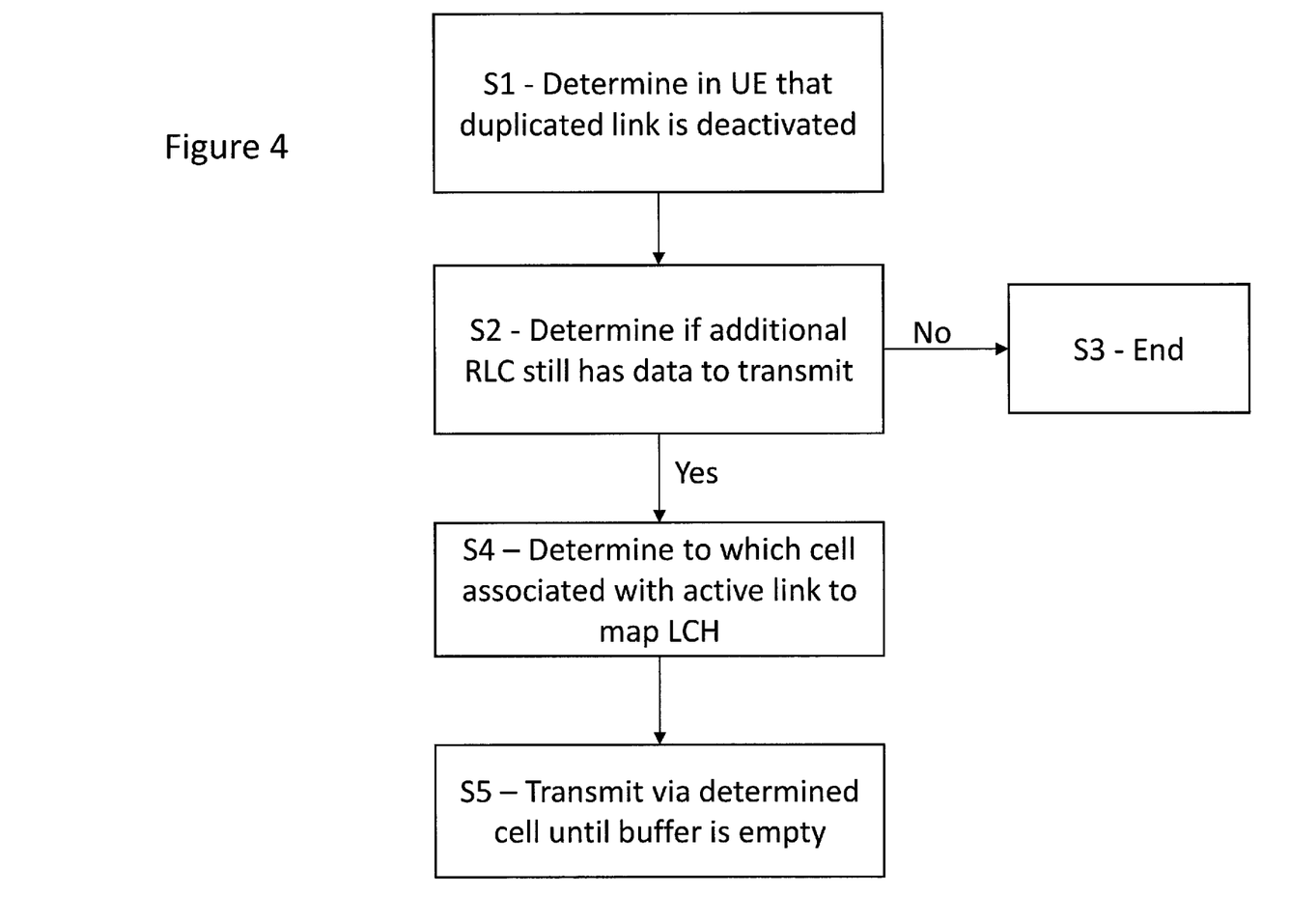
FIG. 4 shows a method flow of an embodiment.

Reference is made to FIG. 4 which shows a method in a user device.

In step S1, a determination is made as to whether a duplicated link has been deactivated. In some embodiments, this is done by determining if all of the cells associated with the duplicated link have been deactivated. These cells may be PCell or SCells. In the example of FIG. 3, if it is determined that both the second and third SCells have been deactivated, then it can be determined that the duplicated link has been deactivated.

In step S2, a determination is made as to whether the additional RLC buffer, that is the buffer associated with the additional or duplicate link, has any data left to transmit to the gNB.

If not, the method ends in step S3.

If so, the next step is step S4, where a determination is made as to which of the cells associated with the active link the LCH of the duplicate link is to be mapped. In the example of FIG. 3, this will be one of the PCell and the first SCell. In the example shown in FIG. 3, the data from the additional RLC buffer is provided to the scheduling/priority handling part which will pass at least a part of that data to the multiplexer associated with the original RLC link, i.e. the non-duplicated link.

In step S5, the data in the additional RLC buffer is transmitted until there is no data in that buffer. In some embodiments, only part of the data may be transmitted.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. An apparatus comprising:
   at least one processor; and
   at least one memory storing instructions thereon that, when executed by the at least one processor, cause the apparatus to perform at least:
      determining a deactivation of packet data convergence protocol (PDCP) data duplication for a radio bearer configured for PDCP data duplication, wherein the radio bearer configured for PDCP data duplication is associated with an original radio link control (RLC) entity and a duplicate RLC entity; and
      responsive to said deactivation,
         determining that the duplicate RLC entity has remaining duplicated data to be transmitted after said deactivation,
         causing mapping of a logical channel associated with the duplicate RLC entity of the radio bearer to at least one active cell associated with the original RLC entity of the radio bearer, and
         transmitting the remaining duplicated data of the duplicate RLC entity on the logical channel to the at least one active cell.

2. The apparatus of claim 1, wherein the instructions, when executed by the at least one processor, further cause the apparatus to perform:
   determining the at least one active cell of active cells associated with the original RLC entity of the radio bearer to which the logical channel associated with the duplicate RLC entity of the radio bearer is to be mapped.

3. The apparatus of claim 1, wherein said at least one active cell comprises at least one of: a primary cell or a secondary cell.

4. The apparatus of claim 1, wherein the instructions, when executed by the at least one processor, further cause the apparatus to perform:
   causing the remaining duplicated data of the duplicate RLC entity to be transmitted on the logical channel to the at least one active cell until one of: all of the remaining duplicated data has been transmitted or said PDCP data duplication is reactivated.

5. A user equipment (UE) comprising the apparatus as claimed in claim 1.

6. The apparatus of claim 1, wherein the instructions, when executed by the at least one processor, further causes the apparatus to perform:
   determining said deactivation of said PDCP data duplication for said radio bearer configured for PDCP data duplication responsive to deactivation of all of a plurality of active cells associated with the duplicate RLC entity.

7. A method comprising:
   determining a deactivation of packet data convergence protocol (PDCP) data duplication for a radio bearer configured for PDCP data duplication, wherein the radio bearer configured for PDCP data duplication is associated with an original radio link control (RLC) entity and a duplicate RLC entity; and
   responsive to said deactivation,
      determining that the duplicate RLC entity has remaining duplicated data to be transmitted after said deactivation,
      mapping a logical channel associated with the duplicate RLC entity of the radio bearer to at least one active cell associated with the original RLC entity of the radio bearer, and
      transmitting the remaining duplicated data of the duplicate RLC entity on the logical channel to the at least one active cell.

8. The method of claim 7, further comprising:
   determining the at least one active cell of active cells associated with the original RLC entity of the radio bearer to which the logical channel associated with the duplicate RLC entity of the radio bearer is to be mapped.

9. The method of claim 7, further comprising:
   causing the remaining duplicated data of the duplicate RLC entity to be transmitted on the logical channel to the at least one active cell until one of: all of the duplicated data has been transmitted or said PDCP data duplication is reactivated.

10. The method of claim 7, wherein said at least one active cell comprises at least one of: a primary cell or a secondary cell.

11. The method of claim 7, further comprising:
determining said deactivation of said PDCP data duplication for said radio bearer configured for PDCP data duplication responsive to deactivation of all of a plurality of active cells associated with the duplicate RLC entity.

12. A non-transitory computer-readable medium storing program instructions which, when executed by a processor, causes:
determining a deactivation of packet data convergence protocol (PDCP) data duplication for a radio bearer configured for PDCP data duplication, wherein the radio bearer configured for PDCP data duplication is associated with an original radio link control (RLC) entity and a duplicate RLC entity; and
responsive to said deactivation,
determining that the duplicate RLC entity has remaining duplicated data to be transmitted after said deactivation,
mapping a logical channel associated with the duplicate RLC entity of the radio bearer to at least one active cell associated with the original RLC entity of the radio bearer, and
transmitting the remaining duplicated data of the duplicate RLC entity on the logical channel to the at least one active cell.

13. The non-transitory computer-readable medium of claim 12, wherein said at least one active cell comprises at least one of: a primary cell or a secondary cell.

14. The non-transitory computer-readable medium of claim 12, wherein the program instructions, when executed by the processor, further cause:
determining said deactivation of said PDCP data duplication for said radio bearer configured for PDCP data duplication responsive to deactivation of all of a plurality of active cells associated with the duplicate RLC entity.

\* \* \* \* \*